United States Patent [19]

Pipitone et al.

[11] Patent Number: 5,838,428
[45] Date of Patent: Nov. 17, 1998

[54] SYSTEM AND METHOD FOR HIGH RESOLUTION RANGE IMAGING WITH SPLIT LIGHT SOURCE AND PATTERN MASK

[75] Inventors: Frank Pipitone, Temple Hills; Ralph L. Hartley, Rockville, both of Md.

[73] Assignee: United States of America as represented by the Secretary of the Navy

[21] Appl. No.: 810,168

[22] Filed: Feb. 28, 1997

[51] Int. Cl.$^6$ .................................................... G01C 3/00
[52] U.S. Cl. ........................................ 356/3.09; 356/376
[58] Field of Search .................... 356/3.09, 376, 356/2

[56] References Cited

U.S. PATENT DOCUMENTS

| | | | |
|---|---|---|---|
| 4,175,862 | 11/1979 | MiMatteo et al. | 356/375 |
| 4,294,544 | 10/1981 | Altschuler et al. | 356/376 |
| 4,443,706 | 4/1984 | DiMatteo et al. | 250/558 |
| 4,511,252 | 4/1985 | DiMatteo et al. | 356/375 |
| 4,594,001 | 6/1986 | DiMatteo et al. | 356/376 |
| 4,687,325 | 8/1987 | Corby, Jr. | 356/1 |
| 4,846,577 | 7/1989 | Grindon | 356/376 |
| 4,939,379 | 7/1990 | Horn | 250/560 |
| 5,135,308 | 8/1992 | Kuchel | 356/376 |
| 5,135,309 | 8/1992 | Kuchel et al. | 356/376 |

OTHER PUBLICATIONS

Paul J. Besl., "Range Imaging Sensors", Computer Science Department, General Motors Research Laboratories, Warren, Michigan 48090–9055; Mar. 8, 1988.

Submitted for publication in the book "Advances in Machine Vision: Applications and ArchitectureS", J. Sanz, Editor, Springer–Verlag, New York.

*Primary Examiner*—Mark Hellner
*Attorney, Agent, or Firm*—Thomas E. McDonnell; George Jameson

[57] ABSTRACT

A high-resolution range imaging system and method can sense the presence of and determine the position or range of each point on the surface of an object through triangulation calculation methods. A moving pattern of light is projected onto the object to be imaged. This resulting moving light pattern, comprised of vertical planes of light, is achieved by projecting light through a moving mask having a DeBruijn code formed thereon, the light being projected through the mask to provide blurring. The light source has a slit or the like which is between one and two times as wide as the narrowest stripe on the mask. Each light ray of the incoming reflected light pattern is recorded by a detecting device, such as a charge coupled device camera (CCD camera). The detecting device measures the blurring of the light pattern and records the associated gray-scale value, a measurement of the reflected light intensity, at each pixel location. A series of recordings are taken at each pixel location as the structured light pattern moves across the object. A vector defined by the series of gray scale values recorded at each pixel location corresponds to a unique location along the pattern of light. Once the series of gray-scale values is matched to this unique location, the range of each pixel location and a three-dimensional image of the object can be formed using triangulation calculation methods.

15 Claims, 3 Drawing Sheets

SYSTEM AND METHOD FOR HIGH RESOLUTION RANGE IMAGING WITH SPLIT LIGHT SOURCE AND PATTERN MASK

FIELD OF THE INVENTION

The present invention relates generally to methods of and apparatus for sensing the presence or determining the position of an object using triangulation techniques. More particularly, the present invention relates to methods of and apparatus for determining and finding such distances on the basis of matching unique optic sequences of structured light.

DESCRIPTION OF THE RELATED ART

The ability to determine the distance of objects or surfaces in a three-dimensional spatial scene is important in many fields, such as robot or computer vision, reverse engineering, image processing, graphics, animation, object shape recognition (e.g., human face recognition for security purposes), medical applications and manufacturing applications.

Many optical range finding instruments have been built to obtain range images of objects or surfaces in a three-dimensional spatial scene. A range image is a two-dimensional array of numbers which gives the distance from the range imaging instrument to the object to be imaged. It measures the location of each point on the object's surface in three-dimensional space. These instruments are divided into two broad categories, depending on whether they use triangulation methods or time-of-flight methods.

A known triangulation method is called grid coding or the grid code method. The grid code method illuminates an object to be imaged with a pattern of light projected through a stationary array of parallel opaque and transparent stripes of varying width. This pattern is usually formed by a programmable liquid crystal mask. The mask is programmed to change the stripe pattern sequentially by subdividing each parallel stripe width in half and manipulating the sequence of opaque and transparent stripes to correspond to a predetermined binary pattern. The light encoded with the sequence of varying patterns, or frames, is made incident on the object to be imaged and reflected by the object to be imaged to a detection device which records the corresponding binary code at each pixel location. A commonly used detection device is a digital camera having a charge-coupled device (CCD) array detection element. The detection device records a "1" (one) where a transparent line on the mask reflects a plane of light and a "0" (zero) where an opaque line on the mask creates a shadow on the object. The sequences of binary codes of consecutive frames are then matched to the predetermined binary pattern, and a unique column of the projected array is described. By use of well known triangulation calculation methods, the range of each pixel location can be found, and thus a three-dimensional image of the object can be formed.

Primary measures of triangulation method performance include range accuracy or resolution, pixel rate of the detector, and frame rate or speed. The grid code method described above has limitations in terms of range accuracy and resolution. The resolution is limited to the width of the narrowest lines on the mask because the illumination is uniform within each stripe.

Moreover, the grid code method has other limitations in terms of its frame rate and speed in obtaining a range image. The frame rate is limited because the system can record pixel frame data only as fast as the liquid crystal mask can change patterns. This rate is slower than the rate that the camera can record data and the rate that a light can be projected through the mask. As a result, time to develop a range image of an object is dependent on the mask pattern rate of change.

Still further, the traditional grid code method suffers from disadvantages in terms of cost, in that it requires the prohibitive expense of a complex liquid crystal mask. Also, high quality optics for the projector are usually required to project light through the high resolution mask onto the object.

SUMMARY OF THE INVENTION

An object of the invention is to provide a system and method for high-resolution range imaging with improved range accuracy and resolution.

Another object of the invention is to provide such a system and method with increased speed.

Another object of the invention is to provide such a system and method which are inexpensive to implement.

To these and other objects, the invention is directed to a system and method for sensing the presence of and determining the range or distance to points on an object or surface in a three-dimensional spatial scene through triangulation calculation methods.

According to the present invention, a light source and a mask are provided on a turntable. The light source illuminates the mask, and the turntable turns so that a shadow of the mask is projected onto the object in different positions. A detector detects the shadow of the mask formed on the object to determine the range or distance. The pattern formed on the mask is preferably a modified DeBruijn sequence, so that any sequence of six consecutive bits in the mask is unique. The mask can be formed inexpensively, e.g., by a laser printer on a sheet of material used for overhead slides.

The light source provides light emanating from a region which is between one and two times as wide as the narrowest line on the mask. This relation provides blurring, which in turn causes the shadow of the mask to have gray scales rather than sharp cut-offs. The detection of these gray scales increases resolution. The present invention can obtain resolution finer than the stripes on the mask because the stripes are blurred by the shadowing process that projects them on the object. The projected pattern of light is a continuous function, allowing interpolation to increase resolution.

The present invention relies on mask movement to generate the change in projected patterns for each frame. Turntable rotational speeds cause a pattern frame rate of change which exceeds that of the liquid crystal mask pattern of the conventional grid code method.

The mask used in a prototype of the present invention was built with a Vu-Graph transparency and a simple computer printer. Also, high quality and complex optics for the projector are not required to project light through the mask onto the object, thus resulting in a cost saving over the prior art. Because the present invention utilizes blurring or smoothing techniques, an expensive lens for the detecting device is not required.

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

Figure 1:
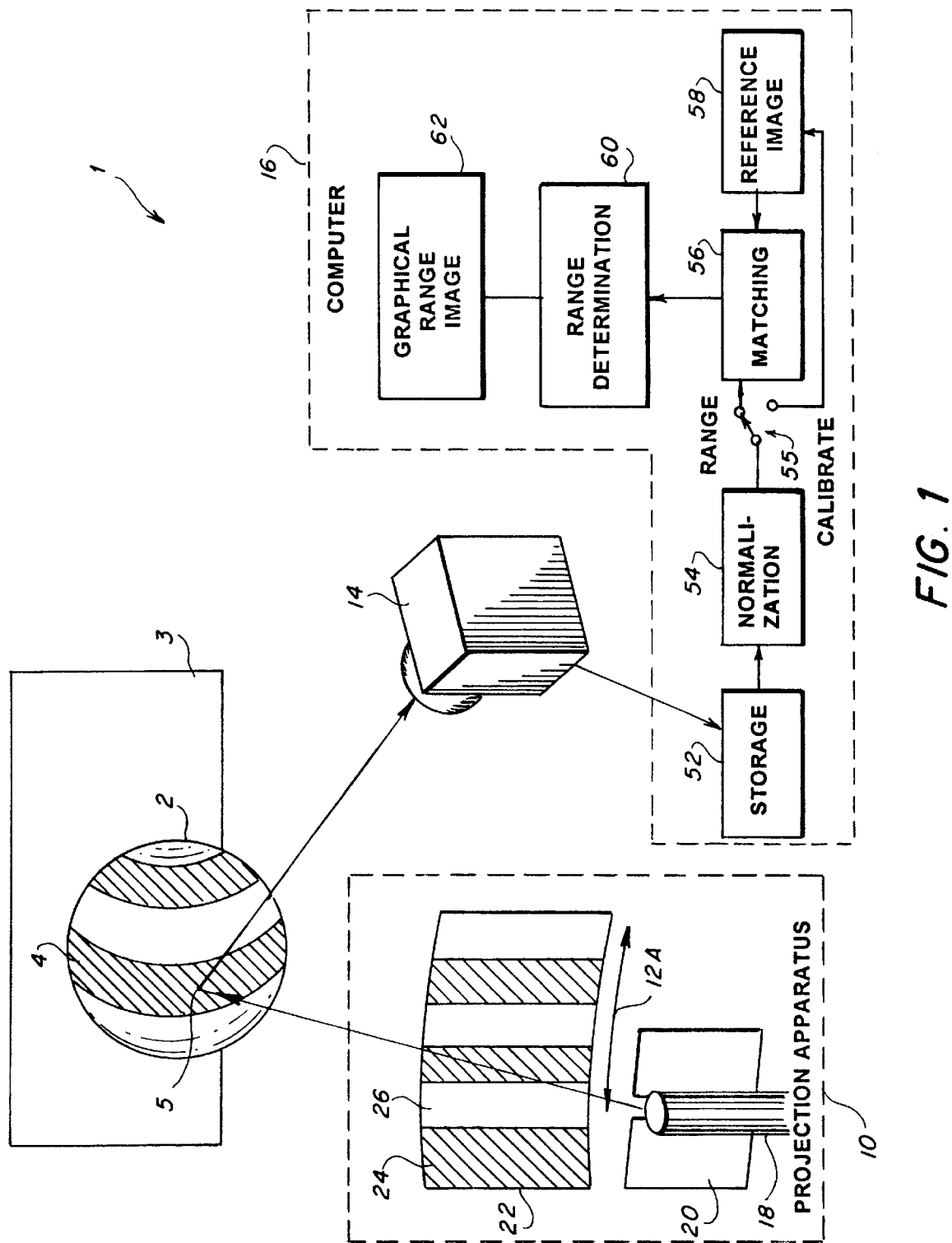
FIG. 1 is a schematic representation of a perspective view of a device for sensing the presence or location of an object according to a preferred embodiment of the present invention.
Figure 2:
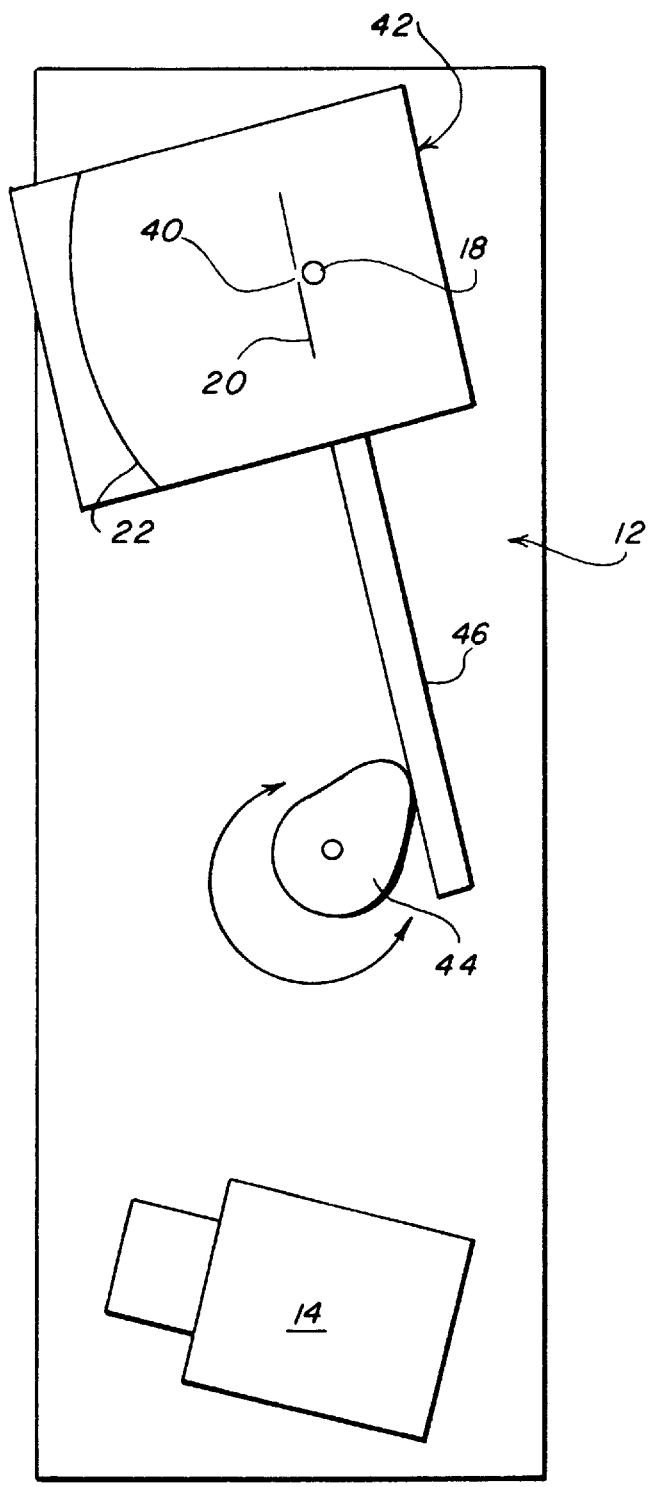
FIG. 2 is a schematic representation of a plan view of the device of FIG. 1.

FIGS. 1 and 2 show a system for implementing the preferred embodiment of the present invention. System 1 includes projector 10 for projecting a pattern of light, or structured light, onto object 2 to form light pattern 4 on object 2, device 12 (FIG. 2 to be discussed but represented in FIG. 1 by double arrow 12A) for moving light pattern 4 across object 2 and device or detection apparatus 14 for detecting and receiving the reflected pattern of light (e.g., a CCD camera) reflected by object 2.

Detection apparatus 14 interfaces with computer 16 so that intensity images of a scene are recorded at appropriate times and later manipulated to produce range images. Computer 16 comprises: storage means 52 for storing the data taken by device 14, normalization means 54 for normalizing the data, matching means 56 for matching the normalized data with a reference image stored in reference image storage means 58, range determination means 60 for determining the range in accordance with the matching done by matching means 56, and graphical range image forming means 62 for forming a graphical range image in accordance with the range determined by range determination means 60. The reference image is generated during a calibration procedure. During the calibration procedure the output of the normalization means 54 is routed (by means not shown but represented as switch 55) to the reference image storage means 58 instead of going to matching means 56. The calibration procedure is otherwise identical to the procedure for producing a range image except that object 2 is replaced by a known reference plane 3. The significance of these operations will be explained in greater detail below. In the prototype of the system according to the present invention, computer 16 has been implemented on an IBM-compatible computer, although a Macintosh, Unix workstation, or other suitable computer could be used instead.

Projector 10 includes cylindrical light source 18, which may be a xenon flash tube, with slit 20 placed in front of it. The slit 20 is positioned coincident with axis of rotation 40 of turntable 42. Binary mask 22 is bent to conform to a cylinder coaxial with this axis. Cylindrical light source 18 illuminates all of binary mask 22 at once. Cylindrical light source 18, slit 20 and binary mask 22 are rigidly attached to device 12 consisting of turntable 42, cam 44 and arm 46 so that when turntable 42 turns under the power of cam 44 and arm 46, turntable 42 imparts the same angular motion to cylindrical light source 18, slit 20 and binary mask 22. Alternatively, the cylindrical light source 18 does not have to be attached to the turntable 42, but can positioned on the axis of rotation 40 so that it does not move.

Mask 22 has alternate opaque stripes 24 and transparent stripes 26 whose long directions are parallel to axis 40. Stripes 24 and 26 are arranged in a pattern that correlates to a modified DeBruijn binary sequence. A DeBruijn sequence of order N is a binary sequence of $2^N$ binary digits or bits in length in which each possible sub-sequence of N bits occurs once. For example, a code for N=6 has $2^6$=64 bits which are arranged such that any consecutive sample of six bits is unique within the pattern. Range accuracy can be increased by modifying the DeBruijn sequence by deleting one or more patterns of N bits, shortening the sequence. In particular, deleting sequences with few transitions between 0 and 1 or 1 and 0 is desirable. The code used in the prototype is:

111111000001000011000101001111010001100100101101110
11001101010, where "0" (zero) represents opacity and "1" (one) represents transparency. The code 000000 was omitted from the prototype because it gives poor position accuracy at its location and provides inaccurate normalization of the intensity readings; therefore, a modified DeBruijn code (modified insofar as it omits 000000) is used. Such a mask may be generated on a conventional computer and printed by a conventional laser printer on a clear sheet used for producing overhead slides. Such clear sheets are sold under the trade name Vu-Graph.

Mask 22 is used such that any given pixel of camera or detection device 14 observes a surface point illuminated only by stripes from one cycle of the code. Thus, one complete cycle or period of a modified DeBruijn sequence of numbers (or columns in a mask) must encompass the whole object or surface area to be ranged to avoid range ambiguity. For example, if a one- or two-cycle mask is used, the object must be placed within one cycle so that a specific pixel location on the object cannot be matched to more than one unique sequence of columns (a sequence of columns within one cycle). This is accomplished by restricting the location of the objects in the scene to within one cycle or by positioning the detection device so that it cannot see through more than a full cycle of the projected stripe pattern.

A specific amount of blur created by the shadow of the mask is desired. With blur, pattern 4 on object 2 is not a set of sharp black and white stripes; instead, it contains gray scales which can be detected by a camera with gray-scale capabilities. Detection of these gray scales permits interpolation to provide resolution finer than the width of one stripe on the mask. The blurring is accomplished by adjusting the relationship between the width of the light source and the width of the thinnest stripe in the mask (the width of one column, namely, the width of one opaque or "0" stripe bounded by two transparent or "1" stripes). This ratio of the width of the light source to the mask column width is adjusted by varying the width of the slit placed between the light source and the mask. Empirical results and computer simulations show that the optimal amount of blur is achieved by a system with a light source width of one to approximately two times the mask column width. Thus, instead of projecting a sharp binary (dark and light) pattern onto the scene, a smoothed version or blurred version of the pattern was projected without using an expensive gray-scale mask. The blurring provides a further advantage in that no lenses or other focusing optics are required.

Figure 3:
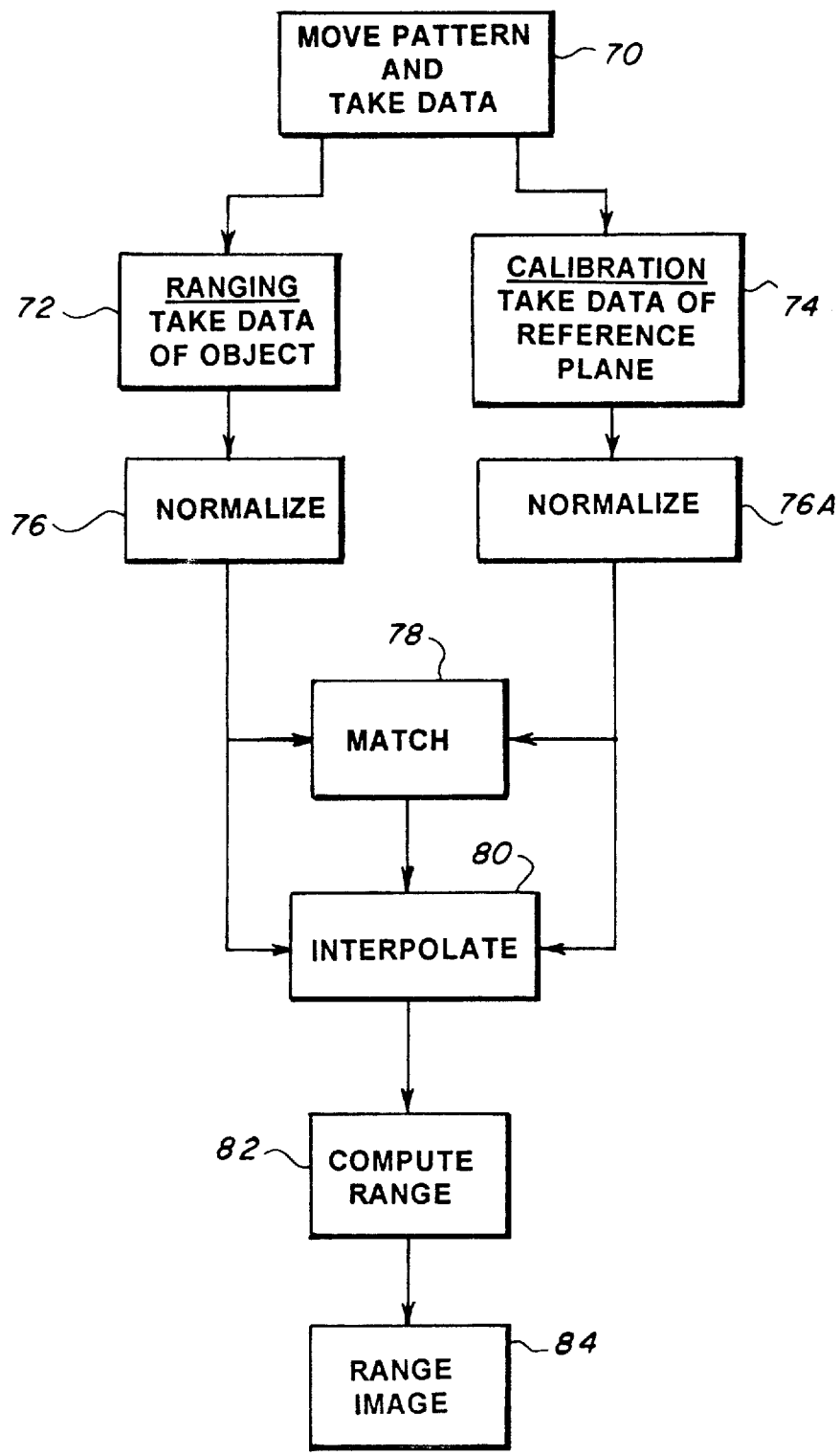
FIG. 3 is a flow chart of a method of range detection according to the preferred embodiment.

System 1 is used in the following manner, which will be disclosed with reference to FIG. 3. Turntable 42 (FIG. 2) is rotated uniformly by cam 44 and arm 46 to move pattern 4 across object 2 to be imaged while data are taken (step 70). Images of object 2 illuminated at uniform angular intervals of the turntable are taken by detection device 14. The interval of rotation is preferably the angular width of one code column. However, a multiple of this interval can also be used. These operations are performed for six consecutive frames, as six is the minimum number of frames necessary to match a discrete sixth-order pattern sequence projected on the object. During calibration it is used to illuminate reference plane 3 without object 2 in the same manner, thereby to obtain both image data from the object (step 72) and reference data from the reference plane (step 74).

In the six consecutive frames, each pixel of detection device 14 records values of the intensity of the reflected projected light at one point 5 on object 2. The vector defined by six values of intensity for one point 5 on object 2, when normalized so that the maximum is unity, is unique to one place in the modified DeBruijn sequence from which it came. It is preferable to normalize the data (step 76) to accommodate reflectance variations and albedo effects, so that light and dark colored objects give the same results. Thus, the position in three dimensions of the surface point 5 with which the camera pixel aligns can be computed through trigonometric techniques that will be readily apparent to those skilled in the art who have reviewed this disclosure. The pixel's ray defines a line in space through the observed surface point. By matching the observed vector of six intensity values at the pixel location with the sequence in the blurred modified DeBruijn code from which the pattern came (step 78) and interpolating by use of the gray-scale values to achieve resolution finer than the width of one pixel in the image (step 80), the plane in space through the projector axis and through the observed point in the scene for each pixel can be determined. The intersection of this plane and the line in space corresponding to the pixel can be determined by trigonometry, allowing the range to be computed. Once the ranges are computed, a range image can be formed (step 84). The six intensity values as a function of position in the blurred modified DeBruijn code can be obtained by performing the entire procedure above with a known reference plane replacing object 2. This calibration process is represented by 74 and 76A in FIG. 3.

Further modifications of the present invention herein disclosed will occur to persons skilled in the art to which the present invention pertains. For example, light source 18 and slit 20 may be replaced by a cylindrical light bulb (e.g., a xenon flash bulb) whose width satisfies the same relationship set forth above for the slit. Such a cylindrical light bulb is located on the axis of rotation 40 of the turntable. Also, the invention can be adapted for use with consumer-oriented digital cameras of the type now sold in electronics stares. Those skilled in the art who have reviewed this disclosure will understand that many such modifications may be made within the scope of the invention, which should therefore be construed as limited only by the appended claims.

What is claimed is:

1. A range imaging system for determining a distance between an object in a three-dimensional spatial scene and a detecting means, said system comprising:
    means for optically projecting a single coded light pattern onto the object, the coded light pattern being a continuous function such that a position within the code can be determined from a sequence of samples, said projecting means including:
        a light source for producing light which emanates from a region having a first width, said region being situated on an axis; and
        a mask having a pattern of transparent and opaque portions and disposed with respect to said light source to be illuminated by the light from said light source so that the transparent portions produce the pattern of coded light, the transparent and opaque portions including a narrowest portion having a second width selected so that the first width is approximately between one and two times as great as the second width;
    means for moving the coded light pattern across the object in a direction parallel to the direction in which the pattern varies;
    means for detecting a portion of the pattern of coded light which is reflected from the object to produce image data; and
    determining means for receiving the image data and for quantitatively determining, in accordance with the image data, range distances from said detecting means to the object.

2. The range imaging system of claim 1 wherein:
    said moving means includes
        a turntable, said optically projecting means being attached to said turntable; and
        means for rotating said turntable;
    said light source and said mask are attached to said turntable to turn with said turntable; and
    said turntable turns about the axis to cause the relative motion.

3. The range imaging system of claim 2 wherein:
    said mask pattern is permanently formed on said mask.

4. The range imaging system of claim 3 wherein:
    said mask pattern comprises at least part of a DeBruijn sequence.

5. The range imaging system of claim 4 wherein:
    the DeBruijn sequence is of order N; and
    the image data comprise N images of the object.

6. The range imaging system of claim 1 wherein said light source comprises:
    a light bulb; and
    a slit, disposed between said light bulb and said mask, having a width equal to the first width.

7. The range imaging system of claim 1 wherein:
    said detecting means comprises means for forming gray-scale image data; and
    said detecting means produces image data which comprise the gray-scale image data.

8. The range imaging system of claim 1 wherein:
    said light source is disposed at said axis so that said light source does not move;
    said mask is attached to said turntable to turn with said turntable; and
    said turntable turns about the axis to cause the relative motion.

9. The range imaging system of claim 1 wherein:
    said detecting means is a digital camera.

10. A range imaging method for determining a distance between an object in a three-dimensional spatial scene and a detector, said method comprising the steps of:
    using a projector to optically project a single, pattern of coded light onto the objects the coded light pattern being a continuous function such that a position within the code can be determined from a sequence of samples, said projecting step including the steps of:
        producing light from a light source which emanates from a region having a first width and which is situated on an axis; and
        illuminating a mask having a pattern of transparent and opaque portions with light from the light source so that the transparent portions produce the pattern of coded light, the transparent and opaque portions including a narrowest portion having a second width selected so that the first width is approximately between one and two times as great as the second width;

causing the pattern of coded light to move across the object in a direction parallel to the direction in which the pattern varies;

utilizing a detector to detect a portion of the pattern of coded light which is reflected from the object to produce image data; and quantitatively determining, in accordance with the image data, range distances from the detector to the object.

11. The range imaging method of claim 10 wherein the pattern of coded light is a fixed pattern which moves linearly across the object.

12. The range imaging method of claim 10, wherein the pattern of coded light comprises at least part of a DeBruijn sequence.

13. The range imaging method of claim 12 wherein:

the DeBruijn sequence is of order N; and the image data comprise N images of the object.

14. The range imaging method of claim 13 wherein, in the pattern of coded light, at least part of the DeBruijn sequence is blurred to provide gray-scale portions in the pattern of coded light.

15. The range imaging method of claim 14 wherein:

said step of detecting forming gray-scale image data; and said image data comprise the gray-scale image data.

* * * * *

UNITED STATES PATENT AND TRADEMARK OFFICE
CERTIFICATE OF CORRECTION

PATENT NO. : 5,838,428

DATED : Nov. 17, 1998

INVENTOR(S) : Frank Pipitone and Ralph L. Hartley

It is certified that error appears in the above-identified patent and that said Letters Patent is hereby corrected as shown below:

On the title page: Item [54] and Column 1, line 3, Change "SPLIT" to --SLIT--

Signed and Sealed this

Seventeenth Day of October, 2000

Attest:

Q. TODD DICKINSON

*Attesting Officer*  *Director of Patents and Trademarks*